UNITED STATES PATENT OFFICE.

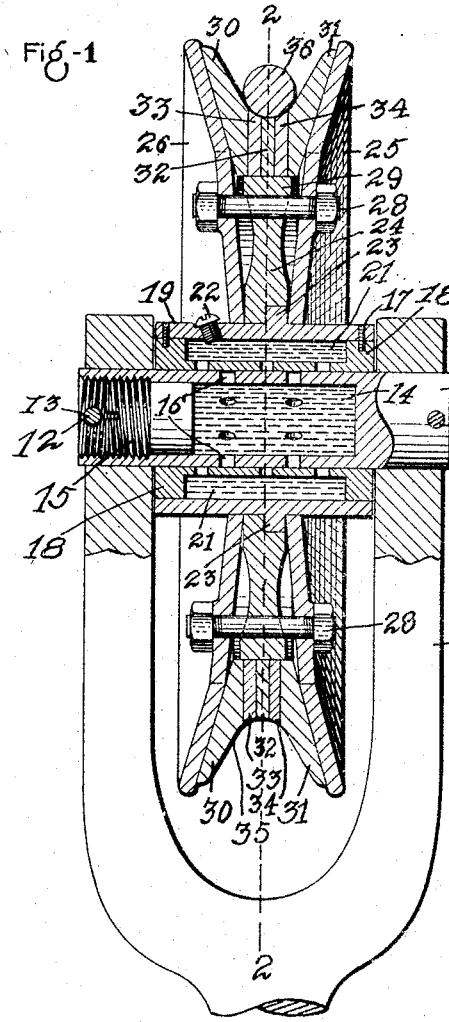

HJALMER C. LINDROS, OF JAMESTOWN, NEW YORK.

TROLLEY.

1,365,513.  Specification of Letters Patent.  Patented Jan. 11, 1921.

Application filed June 30, 1919. Serial No. 307,617.

*To all whom it may concern:*

Be it known that I, HJALMER C. LINDROS, a citizen of the United States, residing at the city of Jamestown, in the county of Chautauqua and State of New York, have invented certain new and useful Improvements in Trolleys, of which the following, taken in connection with the accompanying drawings, is a specification.

The invention relates to trolleys for traction cars; and the object of the improvement is to provide a simple and strongly built-up trolley wheel construction which consists in providing a pair of spoked disks for the oppositely outwardly flared sides of the trolley, to receive therein a plurality of copper or bronze and steel rings alternately placed and formed so as to provide a groove around the outer periphery of the wheel between said flaring disks, a spoked spider being provided between the hub and said alternately placed rings to hold the same firmly in position, and a plurality of bolts preferably one to each spoke being provided to hold the built-up portions firmly in position upon the hub, the hub consisting of a pair of tubular concentric parts arranged to provide an oil chamber therebetween and the trolley harp pin having an oil chamber therein to provide for the thorough lubrication of the built-up trolley on said pin for long distance running; and the invention consists in the combination and arrangement of the parts as shown and described in this specification and the accompanying drawings and pointed out in claims.

In the drawings, Figure 1 is an elevation of a trolley harp with the trolley wheel in position therein in diametral section showing the preferred construction and arrangement of each of the parts. Fig. 2 is a sectional view at line 2—2 in Fig. 1, further revealing the arrangement of the different parts of the built-up trolley. Fig. 3 is a perspective view of one of the outer disk plates, a portion being broken away to show the arrangement of the same. Fig. 4 is a perspective view of the spider with a break therein to show the angular construction of the central ring portion. Fig. 5 is a detail perspective view of the trolley harp pin or cross shaft on which the trolley is revolubly mounted, one of the angular cylinders of the trolley hub being shown thereon with a break therein to show the arrangement of the oiling holes for the trolley pin, both in the pin itself and in said hub cylinder portion.

Like characters of reference refer to corresponding parts in the several views.

The numeral 10 designates the fork shaped trolley harp which has the trolley pin or shaft 11 extending therethrough near the ends of the two arms of said fork shaped harp 10. The pin 11 is preferably held in place by means of cotter pins 12 inserted through the holes 13 crosswise of each end of the pin 11 so that said pin may be quickly and easily removed from the trolley harp whenever it is desired to repair or re-adjust portions of the built-up trolley wheel.

The pin 11 also has the oil chamber 14 therein being made tubular and has the closure plug 15 which is insertible to a sufficient depth to permit the cotter pin 12 to be inserted crosswise of the end of the plug 15. Holes 16 are provided through the sides of the pin 11 to permit the oil in the chamber 14 to run into the bearing between the built-up hub 17 and the pin 11.

The hub 17 may be made in a solid tube or cylinder, but preferably consists of the two concentric parts 18 and 19 which close over one another with a tight joint, the part 18 having the annular channel 20 therein to provide the oil chamber 21 around the hub between said parts 18 and 19. A filling hole to the chamber 21 is closed by a screw 22. This double arrangement provides an oil chamber 14 within the pin 11 and in the hub 17 so that the lubrication of the trolley for long distance running is absolutely insured.

The cylinder 19 has the annular shoulder 23 thereon over which the angular ring portion of the spider 24 fits. The two flaring disk plates 25 and 26 fit, one against the side of the spider 24 and the other against the outer side of the shoulder or flange 23, each disk plate having its inward spoke projections 27. Bolts 28 are provided, preferably one to each spoke and extend through the disk plates 25 and 26 and the spokes 29 of the spider 24, thereby holding all the parts firmly in position upon the built-up hub 17.

Before the bolts 28 are inserted, one of the disk plates 25 or 26 is placed in assembling the wheel, a series of copper or bronze and steel rings 30, 31, 32, 33 and 34 are placed on the disk; the outer contour of these rings provides a peripheral groove 35 around the built-up trolley. The rings 30, 31 and 32 are preferably made of bronze or copper, and the rings 33 and 34 of steel. The steel and bronze or copper rings work well upon one another and the alternately placed steel and bronze parts form a hardened bearing for the trolley wire 36 which wears slowly yet is a good conductor for the electricity. These rings can be quickly and easily renewed at low cost when they become impaired by long continued wear. The flaring disk plates 25 and 26 wear for an indefinite period and the rings 30 and 31 wear nearly as long, the rings 32, 33 and 34 sustaining the major portion of the wear of the trolley. These rings 32, 33 and 34 may be quickly and easily struck out by suitable dies from steel and bronze or copper plates and clamped in position between the two rings 30 and 31, thereby making the upkeep of the trolley exceedingly economical and doing away with a large share of the labor of trolley casting and interchange.

The trolley wire 36 is always in contact with the bronze or copper alloy ring 32 so as always to receive the electrical current. It is apparent that the softer copper alloy rings will wear uniformly with the harder steel rings as they bear against the trolley wire, the arrangement of the rings forming a peripheral groove for the trolley wire with the copper or copper alloy rings 30 and 31 on the outer sides and the central copper alloy ring 32, and the harder metal rings 33 and 34, preferably of steel, therebetween. This arrangement so distributes the copper or copper alloy rings that the slight amount of metal which is worn from said rings by constant pressure against the trolley wire will "solder on to" said trolley wire, as it is called by the traction electricians, the steel rings thereby not impairing the trolley wire 36.

I claim as new:

1. A trolley comprising a central hub and spider portion, disk plates attached one to each side of said spider portion, and a grooved ring portion supported between the outer edge portions of said disk plates around said spider to receive the trolley wire.

2. A built-up trolley comprising a trolley harp, a pin mounted in said harp, a hub rotatatively mounted on said pin and having a shoulder thereon, a spider fitting over said shoulder, a pair of disk plates bolted one to each side of said spider, and a series of rings supported by said spider and disks and shaped to form a peripheral groove around said trolley.

3. A built-up trolley comprising a trolley harp, a crosswise pin removably mounted in said harp, a spider rotatively mounted on said pin, a pair of disk plates one to each side of said spider, a series of rings supported by said spider and between said disks and shaped to form a peripheral groove around said trolley, said series of rings composed of metal of different degrees of hardness and conductivity to prolong the life of said trolley.

4. A trolley comprising a central hub and spider portion, a series of rings of different degrees of hardness and conductivity placed alternately to one another around said spider, and means attached to said spider to clamp and hold said rings in position to form a peripheral groove around said trolley.

5. A trolley comprising a central hub and spider portion, alternately placed copper alloy rings and steel rings around said spider to prolong the life of said trolley, said rings shaped to form a peripheral groove to receive the trolley wire therein, and means on said spider to clamp and hold said rings firmly in position.

In testimony whereof I have affixed my signature in the presence of two witnesses.

HJALMER C. LINDROS.

Witnesses:
C. V. SWANSON,
EDWARD HAWES.